Nov. 2, 1965 W. L. MOHAN, JR 3,215,053
FLIGHT PATH MODULATOR
Filed Aug. 13, 1962 4 Sheets-Sheet 1
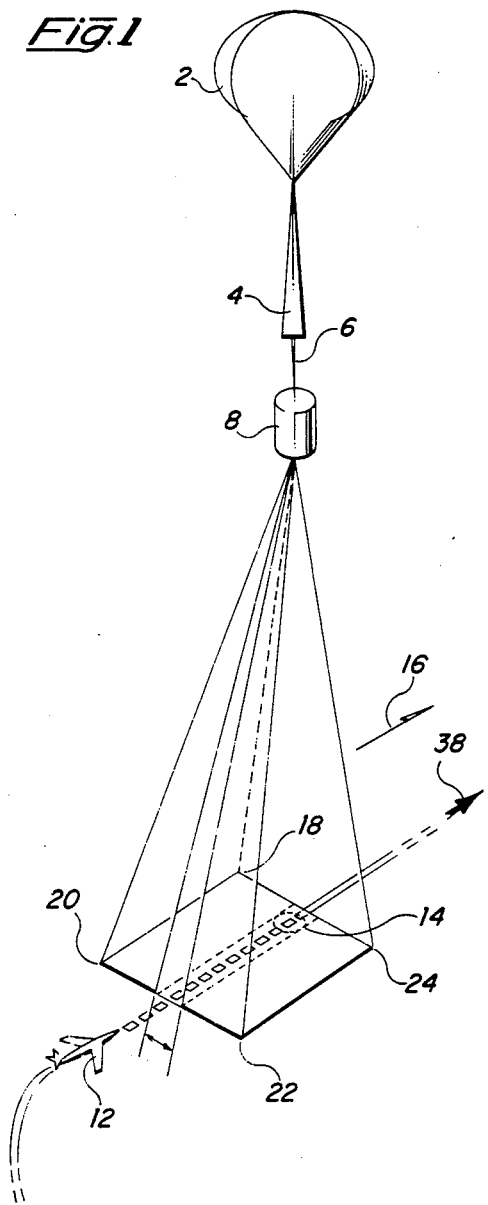
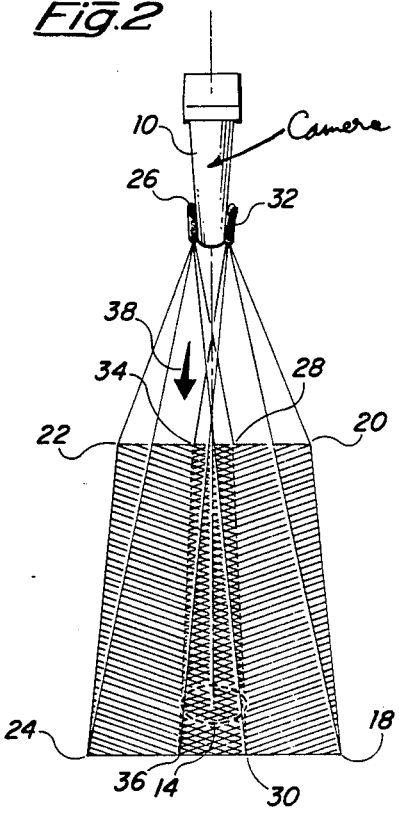
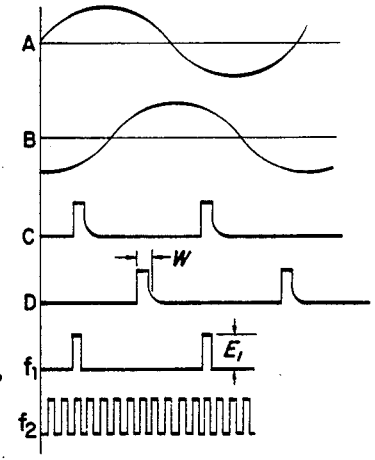
WM. L. MOHAN JR.
INVENTOR.
BY Jacque L. Meister
AGENT.

Nov. 2, 1965　　　W. L. MOHAN, JR　　　3,215,053
FLIGHT PATH MODULATOR
Filed Aug. 13, 1962　　　4 Sheets-Sheet 2
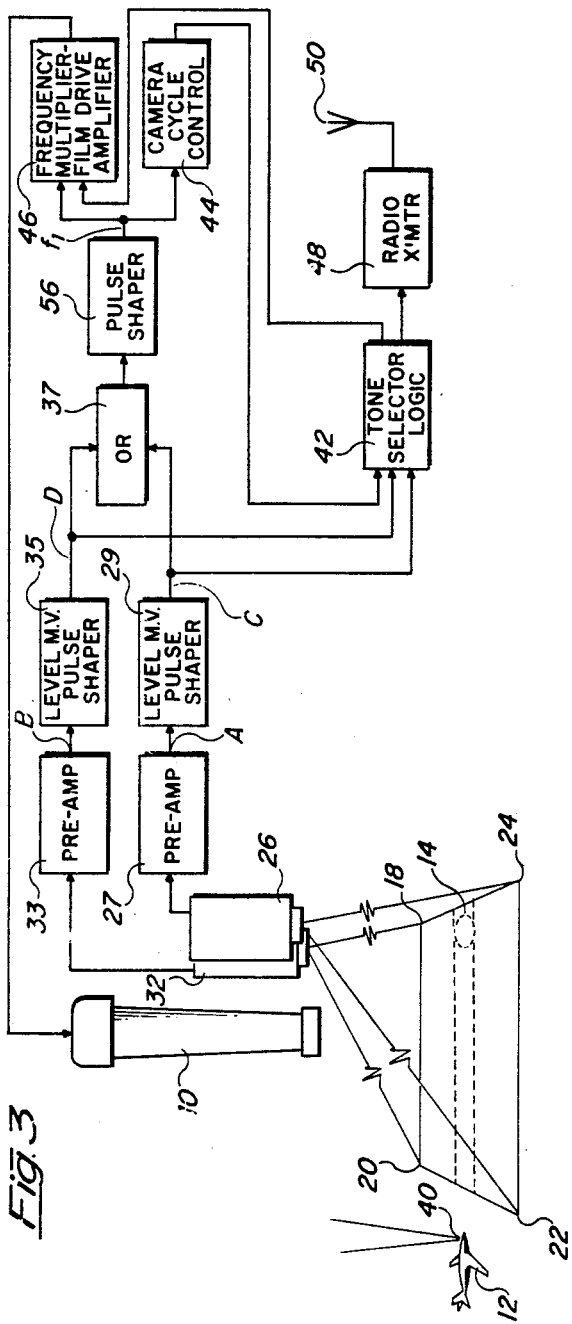
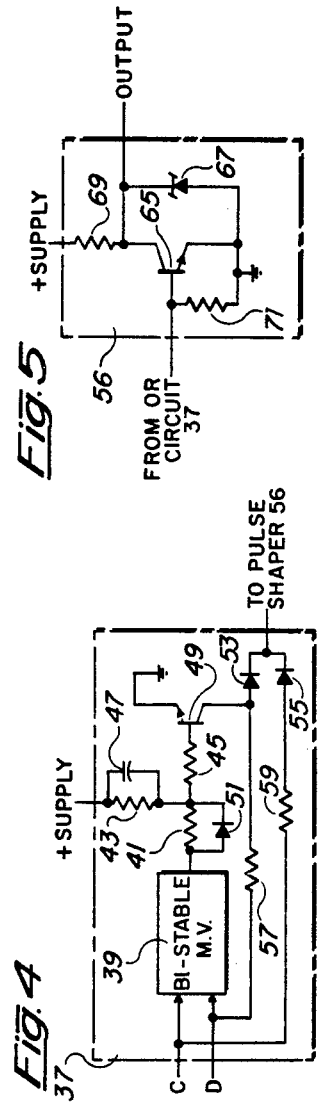
WM. L. MOHAN JR.
INVENTOR.
BY Jacque L. Meister
AGENT.

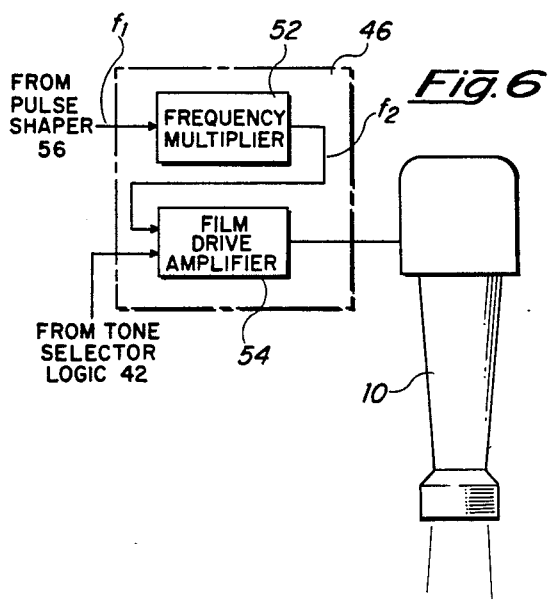
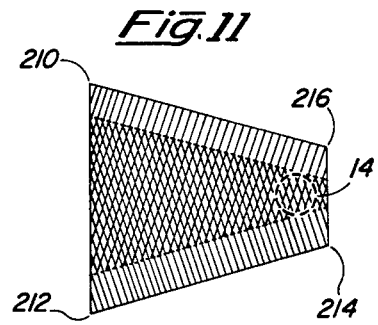
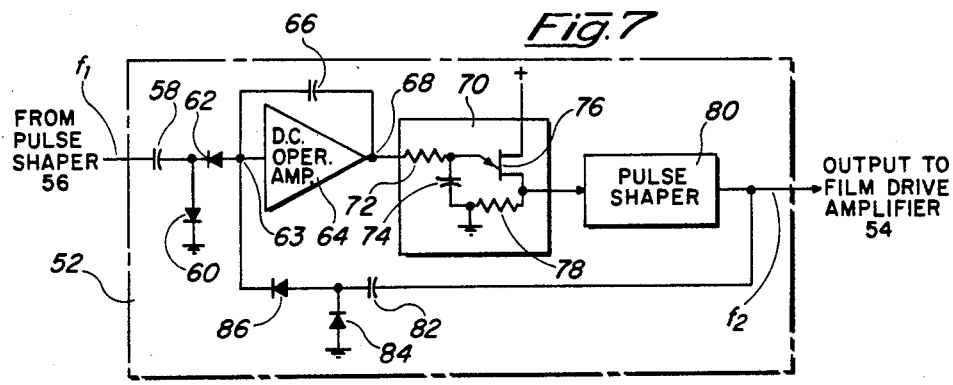
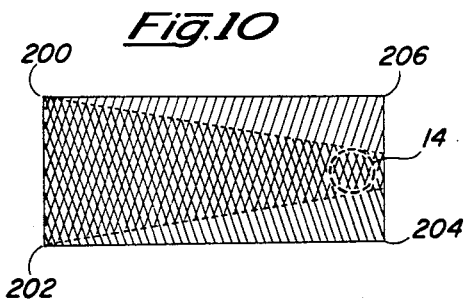

Nov. 2, 1965         W. L. MOHAN, JR         3,215,053
                    FLIGHT PATH MODULATOR
Filed Aug. 13, 1962                          4 Sheets-Sheet 4
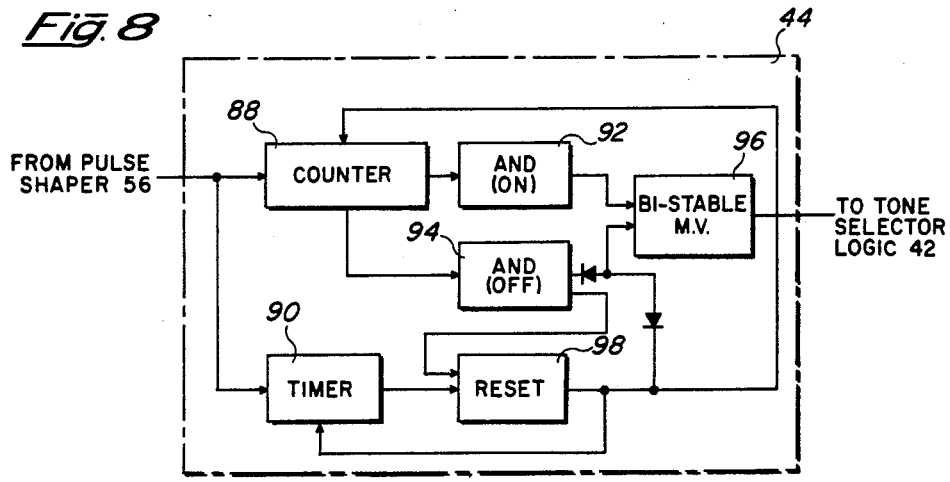
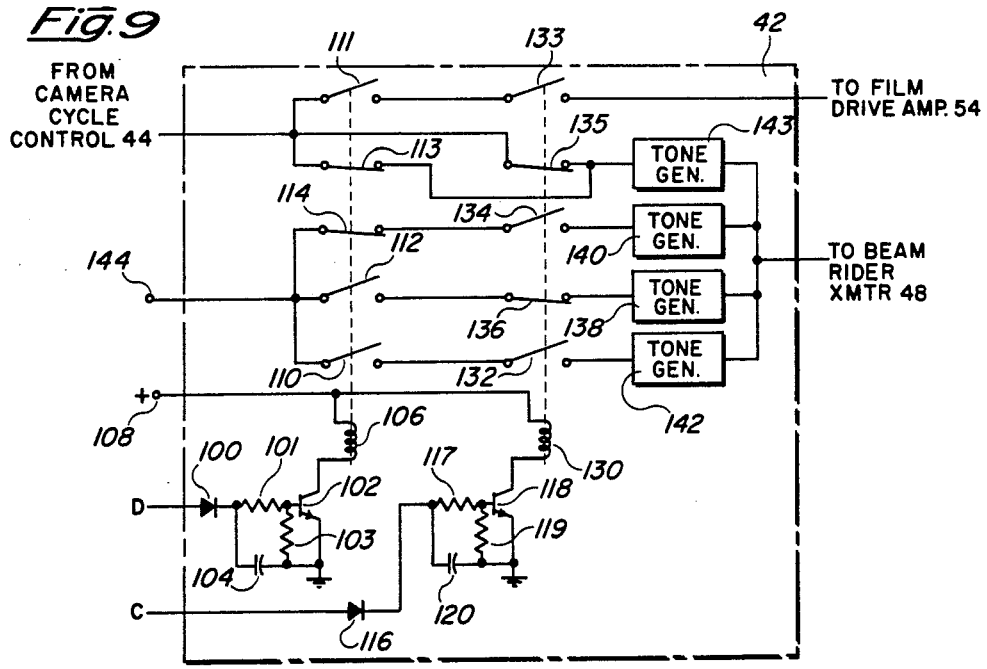
WM. L. MOHAN JR.
    INVENTOR.
BY  *Jacques L. Meister*
            AGENT.

United States Patent Office 3,215,053
Patented Nov. 2, 1965

3,215,053
FLIGHT PATH MODULATOR
William L. Mohan, Jr., Prospect Heights, Ill., assignor to Chicago Aerial Industries, Inc., Village of Barrington, Ill., a corporation of Delaware
Filed Aug. 13, 1962, Ser. No. 216,424
19 Claims. (Cl. 95—12.5)

The invention relates generally to methods for determining the flight path of an aerial vehicle and more particularly to apparatus for detecting the location of a moving object relative thereto and for providing signals to assist the director of the object in traversing a predetermined path.

The effects of upper atmosphere turbulance on the optical performance of photographic equipment are for the most part unknown. Since it appears that in the near future reconnaissance vehicles will be capable of traveling above the atmosphere where turbulance effects of the atmosphere could be important, it has become essential to quantitatively determine these effects. One suggested method for obtaining the necessary data consists of photographing resolution targets located on the top surfaces of high flying aircraft from a still higher vehicle operating in the upper reaches of the atmosphere. In taking such photographs one of the more obvious problems encountered is the precise location of the vehicle bearing the resolution targets with respect to the photographic equipment in the higher flying vehicle.

For various reasons, but principally for reasons of the optics involved, it is necessary if one is to attain the resolution required to obtain useful data, that long focal length lenses be employed. These long focal length lenses unfortunately have relatively limited fields of view, 4° of optical field representing a typical field angle such as might be achieved with a 48 inch focal length lens. With such a limited field angle of the lens, the problem of aligning the photographic equipment with the resolution targets on the aircraft below becomes quite difficult. This alignment problem becomes even more difficult when the photographic equipment is unmanned and must operate automatically.

It is therefore a general object of this invention to provide apparatus which enables a moving object to precisely position itself with respect to another object.

Another object of the invention is to provide a means for automatically initiating exposure in photographic equipment when a moving object is precisely positioned in the field of view of the photographic equipment.

Yet another object of the invention is to provide a navigation system to enable the pilot of an aircraft to fly a course-heading which will precisely position him with respect to an object.

Still further objects and features of the invention pertain to the particular structure and arrangements whereby the above objects are attained. The structure in accordance with the invention comprises plural scanner means of the type generally described in the pending United States patent application of William L. Mohan, Jr., Serial Number 17,829, filed March 28, 1960, now Patent Number 3,084,301. Associated with the scanners, suitable electronic equipment is provided for generating both extremely precise image motion compensation drive in the camera and for triggering the camera when a moving object enters the cone of the camera's acceptance angle. Additionally, the inventive apparatus provides a circuitry for assisting an aircraft pilot to fly a course that will intercept the camera field of view.

In order that the principle of the invention may be readily understood, a single embdiment thereof applied to the foregoing described problems encountered in atmospheric turbulance tests is described, but to which application is not restricted, is shown in the accompanying drawings, wherein:

FIGURE 1 is a schematic, partly in perspective, illustrating the atmospheric turbulance test condition under which the described inventive apparatus operates.

FIGURE 2 is a schematic, in perspective, illustrating the general arrangement of the scanning apparatus of the invention.

FIGURE 3 is a schematic, in block diagram form, of the overall control system of the invention.

FIGURE 4 is a schematic, in block diagram form, of the "or" circuit employed in the schematic of FIGURE 3.

FIGURE 5 is a schematic illustrating in detail a pulse shaper circuit employed in the inventive apparatus.

FIGURE 6 is a schematic, in block diagram form, of the film drive system employed in the invention.

FIGURE 7 is a schematic illustrating in detail the frequency multipler employed in the inventive apparatus.

FIGURE 8 illustrates, in block diagram form, the pulse counting camera cycle control of the invention.

FIGURE 9 is a schematic illustrating the tone selector, logic circuitry of the invention.

FIGURES 10 and 11 illustrates in schematic form alternate plans of the scanner monitored area, and FIGURE 12 is a graphical representation of certain of the voltage waveshapes occurring within portions of the circuitry of FIGURES 3 and 4.

Referring now in detail to the drawings, and specifically to FIGURE 1 thereof, there is illustrated in schematic form the conditions under which the inventive apparatus is intended to operate. Beneath a balloon 2 and a recovery parachute 4 there is suspended by means of a cable 6, an instrument capsule 8. Contained within the instrument capsule 8 and not illustrated in FIGURE 1, is the camera 10 with which it is desired to photograph a test pattern located upon an aircraft 12 flying a considerable distance below the instrument capsule. The camera 10 not being a part of the invention is not described in detail herein. However, an understanding of some of the camera's features and requirements will assist in the description which follows.

Camera 10, includes a film drive system which moves the film during the exposure interval to compensate for image motion at the film plane. This film movement during exposure is known to those versed in the aerial camera art as IMC (Image Motion Compensation) and is necessitated by relative motion between the camera and the object it is desired to photograph. This camera IMC drive advantageously is accomplished in camera 10 by means of a synchronous motor, which by virtue of its ability to maintain an exact ratio of speed to input frequency, enables a simplified "open-loop" type servo to be employed. For the purpose of keeping the following description as uncomplicated as possible, it is assumed that camera 10 is of the "auto-cycle" type, that is, a camera which generates its own shutter trip pulses with a frequency that is a function of IMC speed. As will be apparent to those versed in the control of aerial cameras, changes could be made in the camera and, compensating therefore, changes made in the inventive apparatus to allow the described IMC drive to function as described and also permit control of the camera cycling rate by externally supplied pulses.

As indicated above, the apparatus of the invention assists the pilot of the aircraft 12 in finding and maintaining the flight path that will result in the aircraft passing entirely within the field of view 14 of the camera 10. Also, the inventive apparatus automatically initiates the picture taking cycle of the camera 10 when the aircraft enters the field of view 14 and provides signals to the film drive mechanism of the camera 10 to cause the film to be advanced at the image motion compensation rate. In accomplishing these objectives, the inventive apparatus is assisted by other apparatus not forming a part of this invention, which apparatus detects any variation of the camera from a preselected compass heading 16 and, as required, continuously corrects and reorientates the camera to that compass heading.

The pilot of the aircraft 12 while generally maintaining a course heading 16, is assisted by the inventive apparatus in finding and maintaining a flight path that intersects the format area 14 of the camera 10. This is accomplished by using the optical scanners of the invention to effectively lay out and monitor an area in the sky, which area is schematically indicated in FIGURES 1, 2 and 3 as bounded by the co-ordinate points 18, 20, 22 and 24. The aircraft 12 traversing this monitored area gives rise to signals at the scanner outputs. The scanner output signals are processed and used to create signals indicative of whether the approach path of the aircraft is to the left, right, or dead-on the course which will intersect the camera format area 14.

FIGURE 2 schematically illustrates the general arrangement of the scanning apparatus of the invention whereby the monitored sky area 18, 20, 22 and 24 is established. Affixed to the camera 10, is a scanning apparatus 26 whose field area includes that portion of the monitored area bounded by the coordinate points 28, 22, 24 and 30. Also affixed to the camera 10, is a second scanning apparatus 32 whose field area is within the monitored area and is bounded by the coordinate points 20, 34, 36 and 18. As can be seen in FIGURE 2, the two scanning apparatus together define the monitored area and have an overlapping area bounded by the co-ordinate points 28, 34, 36 and 30. Advantageously the camera field of view 14 is located within the overlapping area. Those versed in the scanner art will now appreciate that if a scanner detectible object flying in the direction of arrow 38 enters the scanner monitored area, appropriate signals indicative of a flight path to the right or to the left of the desired flight path can be created from the scanner output signals. For example, and referring to FIGURE 2, if the detectible object enters the field of view of the scanner 26 alone, then the object must be to the left of the desired flight path. Similarly, if the detectible object is in the field of view of the scanner 32 alone, it is to the right of the desired flight path. Obviously when the detectible object is within the field of view of both scanners it is within the desired flight path.

FIGURE 3 schematically illustrates in block diagram form, the overall control system of the invention. The two scanners 26 and 32 which define the monitored area 18, 20, 22 and 24, may advantageously be of the type described in the aforementioned Mohan patent application. In such scanners an objective lens forms an image of the ground or, in this case of the monitored area, upon a grid comprised of parallel, alternately active and inactive photosensitive strips. Motion of an image or contrast spot across this grid causes instantaneous variations in the light flux reaching the active strips of the photosensitive film. The output of the cell then has a predominant component whose frequency equals the number of grid bars traversed per unit time. The rate of image travel in the focal plane of the objective lens of the scanner is:

$$v = \frac{V}{H} F$$

where:

$v$ = image velocity at the focal plane in inches/second.
$V$ = relative velocity between the scanner and its imaged area in feet/second.
$H$ = altitude separation in feet between scanner and its imaged area.
$F$ = focal length of scanner objective lens in inches.

The frequency at which the inactive grid strips interrupt light transmission to the active grid strips of the photocell is:

$$f = \frac{v}{P} = \frac{V}{H} \cdot \frac{F}{P}$$

where:

$f$ = frequency in cycles/second.
$P$ = grid pitch in inches.

The output signal from a scanner is generally a complex waveform in which the predominant component of frequency, used in the computation of $V/H$, is both phase and amplitude modulated. These unwanted side effects are due to the fact that the targets which generate the scanner signals are leaving and entering the active field of the scanner at random intervals. However, the atmospheric turbulance test requires a higher degree of accuracy in the determination of $V/H$ than possible with this type of complex waveform. Therefore, for these tests it is necessary to eliminate all random inputs to the scanners and allow only a single point source to traverse the scanner grids. Because the upper atmospheric tests are being conducted above the major part of the atmosphere, this can be accomplished by placing a band pass filter over each scanner's objective lens (scanners 26 and 32), which filters are centered at 1.4 microns. At this wave length, the atmosphere's ability to pass radition reflected from the ground is essentially zero. Then, if an incandescent light source is positioned on top of the target aircraft to act as a point source input to the scanners, the scanners will not be influenced by the majority of ground terrain contrast gradients.

From the foregoing, it can be seen that when the aircraft 12 bearing an incandescent light source 40 enters the area monitored by the scanners 26 and 32, depending on the location of the source one or both of the scanners will generate a frequency proportional to $V/H$. Then, because the scanner fields are overlapped the $V/H$ signals can be used to guide the pilot along the proper flight path, provide an image motion compensation signal to the camera and automatically begin the cycling of the camera when the aircraft reaches the camera format area 14.

To assist in the following detailed description of the circuitry of the invention, reference will be made from time to time to FIGURE 12 wherein wave shapes present in various portions of the circuitry of FIGURES 3 and 4 are graphically illustrated. Time increases from left to right in FIGURE 12, but no attempt has been or can be made to relate in time to the several signals therein shown unless the accompanying description indicates that a particularly illustrated relationship is valid.

Those skilled in the electronic and scanning arts will appreciate that the output signals of the cells employed in scanners 26 and 32 are of very low amplitude and unsuitable for transmission over any considerable distance. Consequently, in the preferred practice of the invention, the output of each scanner is applied to a preamplifier, scanner 32 being associated with preamplifier 33 and scanner 26 being associated with preamplifier 27. The preamplifiers are of conventional construction and hence are not considered in detail herein. However, since the associated circuitry described hereinafter employs low impedance inputs, the outputs of the preamplifiers provide this form of output.

The output of preamplifiers 27 and 33, A and B respectively in FIGURE 12, are each fed to a level multivibrator and pulse shaping circuit, circuits 29 and 35 respectively. The circuits 29 and 35 are identical to each other and are employed for the same purpose in each scanner channel. The level multivibrator portion of their circuits is a conventional bi-stable multivibrator biased to trigger only at two predetermined levels, one level triggering the multivibrator to a first state and the other to a second state. If these triggering levels are judiciously chosen to bracket the center portion of the scanner output voltage, for each cycle of the scanner output two changes of multivibrator state will occur. In this manner, the level multivibrator functions to reject noise in the scanner signal and, in combination with its associated pulse shaper, serves to double the relatively low scanner output frequencies.

The pulse shaper portions of circuits 29 and 35 may be of any conventional construction but preferably each gives rise to a series of clipped positive going pulses. Clipping of the pulses is desirable to give some finite pulse width and hence facilitates the operation of subsequent circuitry. In one representative embodiment, such a result was achieved by coupling each side of the level multivibrator through a capacitor and blocking diode to the base of a transistor normally biased on. With a charging resistor provided for each of the two coupling capacitors and the output taken across the transistor load resistor, two output pulses of finite width result from each cycle of the scanner input frequency. The output of circuits 29 and 35 are illustrated in FIGURE 12 as C and D respectively.

Other equally satisfactory methods of pulse shaping will no doubt occur to those versed in the electronic arts. However, because the method described above is more simply achieved than many others, it is currently preferred. The shaped pulses C and D are fed to both tone selector logic circuit 42 and "or" circuit 37.

Logic circuit 42 is employed to determine whether or not the aircraft 12 is within the field of view of one or both the scanners 26 and 32, and thereupon provide appropriate signals to the aircraft pilot to assist him in guiding the aircraft to an intercept with the field of view 14 of camera 10. The tone selector logic circuit 42 is described in greater detail hereinbelow in connection with FIGURE 9 of the drawing. The output of circuit 42 is relayed to the aircraft pilot by means of a radio transmitter 48 and an antenna 50. Details of the transmitter 48 are not explained herein, since the transmitter may be one of many suitable types well known in the arts. Also, and obviously the transporting aircraft 12 must be provided with a receiver appropriate for receiving the transmitted signals.

Or circuit 37 is illustrated in FIGURE 4 in more detail than in FIGURE 3. As will be apparent to those versed in logic circuitry, "or" circuit 37 is not the usual or commonly employed type of or circuit. The "or" circuit 37 functions to permit D pulses to be passed to pulse shaper 56 if C pulses are not present. Stated in another manner, "or" circuit 37 passes either C or D pulses to pulse shaper 56 but only passes C pulses if both C and D pulses are present. This result is advantageously accomplished as follows.

Both the C and the D pulse trains are coupled to the input of a conventional bi-stable multivibrator 39. The D pulse is used to trigger multivibrator 39 on, resulting in a negative output therefrom. The C pulse is used to trigger the same multivibrator off, resulting in a zero output therefrom. With a zero output of multivibrator 39, transistor 49 is biased on shorting D pulses to ground. Turning on of multivibrator 39 with its attendent negative output, results in transistor 49 being turned off after a short delay interval. Turning off of transistor 49 unshorts the D pulse train permitting it to be passed to the output. The short delay interval is a result of the R-C time delay circuit comprised of resistors 41, 43, and 45 and capacitor 47. The value of these R-C circuit elements are chosen to result in the short delay interval being sufficiently long to prevent the same D pulse that actuated multivibrator 39 from being passed to the output. This delay need only be slightly longer than pulse width "w" illustrated in FIGURE 12. Diodes 53 and 55 isolate the C and D pulses from each other and resistors 57 and 59 provide an impedance in their respective circuits to prevent loading of the output of circuit 37 or shortcircuiting of the inputs thereto as a result of circuit operating conditions in pulse shaper 56.

The offset necessary between the C and D pulses at the input o fthe inventive "or" circuit 37 causes an unexpected and advantageous result. This advantageous result is encountered in the physical arrangement of the two scanners 26 and 32. To arrive at the necessary offset in pulses C and D, it is necessary that the scanners purposely be arranged with their grid bars out of phase. As illustrated in FIGURE 12 this out of phase condition is 90 degrees. However, it has been determined that the phase difference may be smaller or greater than this over very broad margins. The only requirement on grid phasing is that it be at least great enough to cause some slight time spacing between pulses C and D when the scanner frequency is at the anticipated maximum. The advantageous result is due to the relatively "sloppy" scanner phasing required and must be contrasted with the extremely precise phasing required if the signals C and D had to be in exact phase as would be required by some types of "or" circuit.

The output of "or" circuit 37 is passed to pulse shaper 56. Pulse shaper 56 is illustrated in FIGURE 5. Pulse shaper 56 could perhaps be described more accurately as a pulse repeater or reshaper, since it does just that to the pulses received. However, and very important, pulse shaper 56 also provides a very precise pulse amplitude and a low impedance at its output. A precise pulse amplitude and a low source impedance are required by certain subsequent circuitry as brought out below.

Transistor 65 is normally biased off and the output voltage is that developed across precision zener diode 67 from the positive source to ground. A pulse at the input of pulse shaper 56 turns transistor 65 on. With transistor 65 turned on, the output of pulse shaper 56 is shortcircuited to ground. Resistor 69 is a transistor load resistor and resistor 71 provides a collector leakage path to ground. The circuit's output is a series of pulses whose duration and spacing are substantially those of the C or D pulses at the input but whose amplitude is that developed across the precision zener diode 67.

The output of pulse shaper 56 is supplied to both the camera cycle control 44 and to the frequency multiplier-film drive amplifier circuitry 46 of the invention. The camera cycle control 44 functions to initiate camera operation when the aircraft is within the format area 14 of camera 10. The details of operation of the frequency multiplier-film drive amplifier 46 and of the camera cycle control 44 are described in connection with FIGURES 6–8 inclusive.

In FIGURE 6 the film drive employed in the inventive system is illustrated in block diagram form. The output of pulse shaper 56 is fed as an input to frequency multiplier 52. As described above, the pulse shaper output frequency is representative of $V/H$. The relatively low pulse rate at the input to multiplier 52 is therein increased to a higher and preselected multiple of the input frequency, which higher frequency is more desirable for the accurate control of synchronous motors such as are advantageously employed in the film drive system of camera 10. The output of frequency multiplier 52 is impressed on film drive amplifier 54 which may be any suitable conventional type of A.C. power amplifier. Film drive amplifier 54 is connected at its output to the synchronous image motion compensating drive motor of camera 10. A second input to film drive amplifier 54 is provided from the camera cycle control 44. This second input is operated upon by logic elements in tone selector logic 42 and is used to switch the amplifier on or off to prevent wastage of film and power during intervals when the transporting aircraft is not within the field of view 14 of the camera 10. Either when the aircraft has progressed sufficiently through the monitored sky area to enter the field of view 14 or slightly therebefore, depending upon camera characteristics, an output gate control signal is generated in the camera cycle control 44. If the aircraft is within the desired flight path as defined by the overlapped areas of the scanner fields of view, tone selector logic 42 passes the output signal of camera cycle control 44 to the input of film drive amplifier 54 for the purpose of opening a gate therein. Opening of this gate permits the output of amplifier 54 to be applied to the synchronous motor employed in the image motion compensating film drive of camera 10 and initiates camera operation. Camera cycle control 44 and tone selector logic circuit 42 are described in detail below in connection with FIGURES 8 and 9.

As will be apparent to those versed in the control of aerial cameras, under some circumstances it may prove advantageous to depart from the schematic representation of FIGURE 6. One such circumstance arises where the time necessary for the film drive motor to come up to speed is quite long or is an appreciable part of the interval when aircraft 12 is within the camera field of view. In this case, the invention provides for the aforementioned gate opening output signal of the camera cycle control 44 being applied directly to the camera 10 instead of film drive amplifier 54. In that event the gate pulse applied to camera 10 is used to actuate a clutch connecting the film drive mechanism to the synchronous film drive motor and the film motor is brought up to speed as soon as the aircraft enters the scanner monitored area.

FIGURE 7 illustrates in greater detail than FIGURE 6 the circuitry of the frequency multiplier 52. As explained above, the precision amplitude pulse train at the output of pulse shaper 56 is connected to the input of frequency multiplier 52. These pulses at the output of pulse shaper 56 are applied to a capacitor 58 which, during positive excursions of the pulses, is charged through diode 60 to ground. Diode 62 isolates the input 63 of operational amplifier 64. During negative excursions of the input pulses, capacitor 58 is discharged through the pulse shaping circuitry 56 resulting in a negative current at the input 63 of operational amplifier 64. The negative current at the input 63 of operational amplifier 64 causes the amplifier to raise the potential at point 68 of the circuitry. The changing potential at point 68 in turn causes a feedback to point 63 through integrating capacitor 66. This feedback current through capacitor 66 is equal and opposite to the discharge current of capacitor 58 and results in the potential at point 63 being maintained at essentially zero. As successive ones of the pulses from pulse shaper 56 are impressed upon capacitor 58, it is alternately charged and discharged tending to cause the potential at point 68 to rise in step fashion. An absolute limit on the potential at point 68 is achieved by means of feedback circuitry described below.

From point 68 the signal is passed to a voltage to frequency converter circuit 70. In this circuit, each pulse or step in the output at point 68 charges the capacitor of the conventional RC network comprised of resistor 72 and capacitor 74. When the charge upon capacitor 74 reaches some predetermined point, current at the emitter of uni-junction transistor 76 causes the two bases of that transistor to be connected together effectively shorting and discharging capacitor 74 through voltage limiting resistor 78 to ground. Since the input to the voltage to frequency converter circuits 70 may be looked upon as a varying D.C. level, it can be seen that the output of circuit 70 is dependant upon the voltage at the input, the RC time constant of resistor 72 and capacitor 74, and the bias applied to uni-junction transistor 76. The output frequency of voltage to frequency converter 70 is passed to the pulse shaper circuit 80.

Pulse shaper circuit 80 is not described in detail herein, but, is of a type well known to those versed in the electronic arts. Pulse shaper 80 comprises a "pull-chain" type multivibrator in combination with suitable clamping circuitry. "Pull-chain" multivibrators are of the type responsive to sequential pulses of preselected potential applied to their input to alternately flip from on to off. Advantageously a clamping circuit at the output of pulse shaper 80 clamps the excursion of the "pull-chain" multivibrator to the same amplitude excursion as that present at the output of pulse shaper 56. The output of pulse shaper 80 is utilized to drive the A.C. power amplifier shown in FIGURE 6 and, in addition, it is utilized to provide feedback to the input of D.C. operational amplifier 64.

As the square waves from pulse shaper 80 are impressed upon feedback capacitor 82, it is alternately charged by virtue of its connection through diode 86 to point 63 of the circuit and then, by virtue of its connection through diode 84 to ground, discharged. If feedback capacitor 82 is chosen to have one tenth the capacitance of capacitor 58, the output of the frequency multiplier circuit 52 will stabilize at a frequency ten times that of the frequency at its input. Why the ratio of input to output frequencies of multiplier 52 is dependent upon the relative capacitance of capacitors 58 and 82 will become apparent if it is recognized that the voltage at point 68 of the circuitry will stabilize when the current in at point 63 is equal to the current out of the same point. Since current in and out at point 63 are:

$$i_{in} = C_{82} E_1 f_2$$
$$i_{out} = C_{58} E_1 f_1$$

where:

$i_{in}$ = current in at point 63
$i_{out}$ = current out at point 63
$C_{82}$ = capacitance of capacitor 82
$C_{58}$ = capacitance of capacitor 58
$f_1$ = input frequency
$f_2$ = output (feedback) frequency
$E_1$ = pulse amplitude at input From the foregoing it can be seen that if capacitor 58 has ten times the capacitance of feedback capacitor 62, the output frequency, $f_2$ must be ten times the input frequency, $f_1$.

FIGURE 8 illustrates in more detail than FIGURE 3 the camera cycle control 44 of the invention. The output of pulse shaper 56 is impressed both upon a counter 88 and upon a timer 90 within the circuitry of the camera cycle control. While counter 88 is not shown in detail herein, advantageously it may consist of a number of bi-stable "pull-chain" type multivibrators. The number of multivibrators employed in the counter is principally dependent upon the absolute number of scanner grid bars which the image of the aircraft 12 must traverse after entering the scanner monitored area and before reaching camera format area 14. If, by way of example, one hundred scanner lines or grid bars must be traversed by the aircraft image before reaching camera format area 14, it would be necessary that the number of multivibrators employed be sufficient to count this high. Also, as will be apparent from the description which follows, the counter must have sufficient additional capacity to count the grid bars traversed by the aircraft's image during the interval that the aircraft is crossing the camera format area 14. While the presently preferred counter does employ "pull-chain" types of bi-stable multivibrators and the following circuitry description is dependent upon the use of such multivibrators, it will readily be understood by those skilled in the electronic arts that counting mechanisms of other types could equally as well have been employed. The outputs of counter 88 are fed to two separate "and" circuits 92 and 94 respectively.

And circuit 92 is employed to recognize the condition of counter 88 at the point where the aircraft 12 has just reached the camera format area 14. In response to that counter condition, "and" circuit 92 provides an output pulse which in turn triggers bi-stable multivibrator 96 to an "on" condition. Turning on of bi-stable multivibrator 96 will, if the aircraft has traversed the proper flight path, open a gate in film drive amplifier 54 to initiate image motion compensation drive and film exposure in camera 10. Bi-stable multivibrator 96 remains "on" until either a trigger pulse is received from "and" circuit 94 or from reset circuit 98 either of which pulses will trigger it off. "And" circuit 94 is employed to recognize the condition of counter 88 that is achieved when the aircraft has completed its traverse of camera 10's format area. In response to that counter condition, "and"' circuit 94 provides an output pulse which in turn triggers bi-stable multivibrator 96 to an "off" condition. As a safety feature to insure that counter 88 will be reset, the output pulse of "and" circuit 94 is fed as an input to reset circuit 98. Reset circuit 98 advantageously comprises a mono-stable multivibrator responsive to pulses from "and" circuit 94 at its input to generate an output pulse. The output pulse of reset circuit 98 is set sufficiently long by adjusting the time constant of its multivibrator to insure the resetting of counter 88. Also, by means of its connection to the bi-stable multivibrator 96, reset circuit 98 insures that this multivibrator is turned off. To provide for the possibility that the aircraft 12 will not necessarily intersect the format area 14 of the camera 10 when the output pulse is generated by bi-stable mutlivibrator 96 and to inform the pilot if such an event occurs, the output of the camera cycle control is connected to tone selector logic circuit 42. As described in greater detail below, circuit 42 is then used to signal the pilot if his flight path did not intersect the format area or alternately, if the aircraft did intersect the format area, simply passes the output of the cycle control to film drive amplifier 54.

Certain precautions must be taken to correct for the circumstances where aircraft 12 follows something other than an ideal flight path through the monitored area to the camera format area 14. One such circumstance arises when the aircraft enters the monitored area at some point other than on the leading edge 20–22 thereof. Another such circumstance occurs if the aircraft having entered the monitored area properly through some point on leading edge 20–22, leaves the monitored area before its image traverses a sufficient number of scanner bars to initiate operation of "and" circuit 94. The precautions taken in the inventive apparatus to overcome such circumstances are advantageously embodied in timer 90. Timer 90 has its input connected to pulse shaper 56 and thus has its timing cycle initiated by the first pulse counted in counter 88. Once the timing cycle is initiated, timer 90 continues to function until it is either reset by a pulse applied from reset circuit 98, or, until the end of a preselected interval. At the end of the preselected interval, timer 90 provides an output signal to initiate operation of reset circuit 98. The preselected interval of operation of timer 90 is chosen to be somewhat longer than the longest possible or probable interval that could elapse during a successful traverse of the monitored area by aircraft 12. Timer 90 may be any timer type suitable for measuring the preselected interval with moderate precision, a transistorized type of R-C circuit having been employed in embodiments thus far built.

FIGURE 9 illustrates in more detail than FIGURE 3 the tone selector logic circuitry 42 of the invention. As pointed out above, the tone selector logic 42 receives both C and D pulse inputs originating from scanner 26 or from scanner 32 respectively and processes these signals separately within its circuitry. The D signal originating in scanner 32 is applied through blocking diode 100 as an input to the base of transistor 102 turning it on. With transistor 102 turned on, the coil 106 of a relay is energized by virtue of the coil's connection through the transistor to ground and its connection to a power supply generally designated at 108. The coil is held energized during the intervals between D pulses by means of the R-C circuit comprised of resistor 101 and capacitor 104. Resistor 103 provides a collector leakage path to enable shut-off of transistor 102 at high temperature. From the foregoing description and the schematic illustration of FIGURE 9, it can be seen that as long as an A.C. signal is present at the output of scanner 32, relay coil 106 will remain energized. Relay coil 106 remaining energized closes normally open switches 110, 111 and 112 and opens normally closed switches 113 and 114 associated therewith. The functions of switches 110–114 inclusive are described further below.

In a manner akin to the operation of relay coil 106 by D signal pulses originating in scanner 32, C signals originating in scanner 26 are used to energize coil 130. Whenever a C signal is applied through blocking diode 116 to the base of transistor 118, that transistor is turned on and in turn energizes relay coil 130. Like coil 106, relay coil 130 is connected to current source 108 and by virtue of its connection through transistor 118 to ground, its circuit is completed. Capacitor 120 and resistor 117 connected between the emitter and base of transistor 118 prevent undesirable fluctuations in the output of transistor 118 caused by the A.C. nature of the input C waveform. Resistor 119 functions similarly to resistor 103. The energization of relay coil 130 closes normally open switches 132, 133, and 134 and opens normally closed switches 135 and 136.

As can be seen in FIGURE 9 the various switches 110, 112, 114, 132, 134 and 136 are used to connect a source of potential 144 to tone generators 140 or 138 or 142. With both relay coil 106 and 130 deenergized, i.e., with no C or D output signals from either scanners 26 or 32, the switch condition is exactly as illustrated in FIGURE 9 and there is no connection from source of potential 144 to any tone generator. When scanner 32 is energized by the passage of the aircraft through the field of view defined by its optics, relay 106 is energized closing normally open switches 110, 111 and 112 and opening switches 113 and 114. In FIGURE 9 it can be seen that the closing of switch 112 during periods in which normally closed switch 136 remains closed, provides connection between source of potential 144 and tone generator 138 which is thereby energized. As explaned above, the tone generators are connected at their output to transmitter 48 which transmits the output of the tone generator to the pilot of the aircraft 12 thereby advising him of a left, or right, or on course, flight condition of the aircraft.

In a manner similar to the singular energization of tone generator 138 during the intervals when scanner 32 alone of the two scanners is generating signals, if only scanner 26 is generating signals a connection is provided between source of current 144 and tone generator 140 by way of switches 114 and 134. Tone generator 140 then provides indication to the pilot of aircraft 12 other than that provided by tone generator 138. When both scanners 26 and 32 are energized by the passage of aircraft 12 down the proper flight path, both normally open switches 110 and 132 are closed to energize tone generator 142. Tone generator 142 then generates an output signal to inform the pilot of the aircraft that he is properly approaching the format area of camera 10.

As described above, the tone selector logic circuit 42 provides the additional functions of informing the pilot if his flight path has not intersected the format area or, if it did so intersect, to pass on to film drive amplifier 54 the output gate pulse of cycle control 44. These additional functions are advantageously provided by the switches 111, 113, 133 and 135, tone generator 143 and the various interconnections therebetween. As can be seen in FIGURE 9, the output gate pulse of cycle control 44 is never passed to the film drive amplifier 54 except when normally open switches 111 and 133 are closed and these switches are closed only when the aircraft is traversing the desired and correct flight path. Also, if either relay 106 and 130 is not energized, which condition is indicative of an incorrect flight path, switch 113 or 135 will remain closed and the output pulse of cycle control 44 will energize tone generator 143. Tone generator 143 provides indications to the pilot of a flight path that did not intersect the camera format area.

Those versed in the electronic arts will appreciate that the circuitry illustrated in FIGURE 9 and described above for maintaining transistors 102 or 118 "on" between input pulses, is highly susceptible to variations in the amplitude of the input pulses or to variations in the $\beta$ of the transistor. However, the circuitry illustrated and described here, while presently preferred, is intended to be illustrative only as many obvious changes may be made with regard to both the circuitry and the relays.

In the foregoing description, the scanner monitored area and the aircraft preferred flight path have both been generally rectangular in shape. In some circumstances it has been proved advantageous to monitor areas whose plan varies as illustrated in FIGURES 10 and 11. In FIGURE 10, the monitored area bounded by coordinate points 200, 202, 204 and 206, remain generally rectangular in plan while the desired flight path determined by the overlapping fields of the two scanners generally follows the plan of an isosceles trapezoid. As in the previously described plan for the monitored area, the desired flight path contains the camera format area 14 or if one wishes to consider the general case, the area considered critical. In the contemplation of the inventor, this critical area could be for one illustrative example, the point of aircraft touch-down in a blind flying navigation assistance system.

FIGURE 11 is similar to FIGURE 10, but the monitored area bonded by co-ordinate points 210, 212, 214 and 216 as well as the desired flight path both take the plan of isosceles trapezoids. This plan is especially useful where it is desired to group a plurality of the inventive apparatus to monitor some continuous perimeter or several directions of approach, which objects could not be efficiently achieved with a single one of the inventive apparatus.

Although the examples described above have been an application of this invention to the location of an aircraft beneath a camera supported by a free flying balloon which also supports the inventive apparatus, it will be obvious to those skilled in the arts that this invention may equally well be applied to the location of any moving object with respect to an area defined by the inventive apparatus and that, such location can readily be accomplished for any system of orthogonal coordinates by a duplication of the above described system of the invention. As one illustrative example, the inventor has contemplated the placing of his inventive apparatus in the moving vehicle. This is especially advantageous when it is desired to simplify the equipment installation at the critical area. Also, installing the inventive equipment in the vehicle enables the director of the vehicle to follow a more generalized path to the critical area.

From the above description it will be apparent that this invention provides novel means for the sensing and locating of a moving object in an optically defined area and for initiating activity of secondary systems upon the approach of the object to a predetermined point. While specific embodiments and arrangements have been illustrated in the above description, it will be understood that the details of configuration and construction of the invention may be varied through a wide range without departing from the principles of the invention and the scope thereof as defined in the appended claims.

What is claimed as the invention is:

1. Apparatus for determining the location of an object moving relative to a monitored area defined by said apparatus, comprising scanner means arranged to define said monitored area and for providing an output signal whose frequency is proportional to the angular rate of object movement relative to said scanner means, said scanner means comprising at least two scanners having at least some portion of their field areas in common, tone logic means connected to said scanner means and responsive to the outputs thereof for generating guidance signals indicative of object position relative to the monitored area, and transmitter means connected to said logic means for transmitting said guidance signals.

2. Apparatus for determining the location of a moving object relative to a monitored area defined by said apparatus, comprising scanner means arranged to have their field areas define said monitored area and for providing an output signal whose frequency is proportional to the angular rate of object movement relative to said scanner means, said scanner means comprising at least two scanners having at least some portion of their field areas in common, signal processing means connected to the output of said scanner means for amplifying the scanner output frequency, tone logic means connected to said processing means and responsive to the outputs thereof for generating guidance signals indicative of object position relative to the monitored area, and transmitter means connected to said logic means for transmitting said guidance signals to the director of said object.

3. Apparatus for guiding a moving vehicle along a preselected path within a monitored area, comprising a plurality of scanners positioned to have portions of their field areas overlap and for providing an output signal frequency, the composite field area of said plurality of scanners defining the monitored area, signal processing means for amplifying the scanner output frequency, tone logic means connected to said signal processing means and responsive to the outputs thereof for generating guidance signals indicative of vehicle position relative to the monitored area, and transmitter means connected to said logic means for transmitting said guidance signals to the director of said moving vehicle.

4. Apparatus for guiding a moving vehicle along a preselected path within a monitored area and for sequentially initiating a plurality of control signals dependent on vehicle position within the monitored area, comprising scanner means arranged to have their field areas define said monitored area and for providing an output signal whose frequency is proportional to the angular rate of vehicle movement relative to said scanners, said scanner means comprising at least two substantially identical scanners positioned to have a common overlapping field area, signal processing means connected to the output of said scanner means for amplifying the scanner output signals, for rejecting noise in the amplified signal and for providing a pulse train output whose frequency is proportional to the scanner output frequency, tone logic means connected to said signal processing means and responsive to the pulse train outputs thereof for generating guidance signals indicative of vehicle position relative to the monitored area, transmitter means connected to said logic means for transmitting said guidance signals to the director of said moving vehicle, OR logic means connected to said signal processing means for preferentially passing the pulse output signals of one of said scanner means, and cycle control means connected to said OR logic means and responsive to the quantity of pulses therefrom for initiating control signals.

5. Apparatus for guiding a moving vehicle along a preselected path within a monitored area and for sequentially initiating a plurality of control signals dependent on vehicle position within the monitored area, comprising a plurality of scanners defining said monitored area and for providing an output signal whose frequency is proportional to the angular rate of vehicle movement relative to said scanners, signal processing means connected to the output of each of said plurality of scanners for amplifying the scanner output signal, for rejecting noise in the amplified signal and for providing a pulse train output signal whose frequency is proportional to the scanner output frequency, tone logic means connected to said signal processing means and responsive to the pulse train signal outputs thereof for generating guidance signals indicative of vehicle position relative to the monitored area.

transmitter means connected to said logic means for transmitting said guidance signals to the director of said moving vehicle, OR logic means connected to said signal processing means for preferentially passing the pulse train output signals of one of said plurality of scanners, and cycle control means connected and responsive to the output signals of said OR logic means for providing control signals indicative of said vehicle's progress through said monitored area.

6. Photographic equipment control apparatus responsive to the movement of an object through a monitored area for controlling the operation of one or more cameras, comprising scanner means arranged to have their field areas define said monitored area and for providing an output signal whose frequency is proportional to the angular rate of object movement relative to said scanner, said scanner means comprising at least two substantially identical scanners positioned to have a common overlapping field area containing the field area of said cameras, signal processing means connected to the output of each of said scanner means for amplifying the scanner output signals, for rejecting noise in the amplified signal and for providing a pulse train output signal whose frequency is proportional to the scanner output signal frequency, OR logic means connected to said signal processing means for preferentially passing the pulse train output signals of one of said scanner means, cycle control means connected to said OR logic means and responsive to the output therefrom for providing control signals indicative of the position of said object in said monitored area, film drive means connected and responsive to the output of said OR logic means for providing an output signal to said cameras proportional to the angular rate of said object relative to said photographic equipment control apparatus, and tone logic means connected and responsive to the outputs of said signal processing means and said cycle control means for providing guidance signals indicative of object position within the monitored area and for selectively passing control signals which control the operation of said cameras.

7. Photographic equipment control apparatus responsive to the movement of an object through a monitored area for controlling the operation of at least one camera, comprising a plurality of scanners positioned to have portions of their field areas overlap, said plurality of scanners being adapted to provide an output signal frequency and to define the monitored area by their composite field area, signal processing means connected to the output of each of said plurality of scanners for amplifying the scanner output signal, for rejecting noise in the amplified signal and for providing a pulse train output signal whose frequency is proportional to the scanner output frequency, OR logic means connected to said signal processing means for preferentially passing the pulse train output signals of one of said scanner means, pulse shaper means connected to said OR logic means and responsive to the pulse train output therefrom to precisely control the amplitude of the pulses at its output while maintaining input frequency, cycle control means connected to said pulse shaping means and responsive to the quantity of pulses therefrom for initiating control signals, tone logic means connected and responsive to the output of said signal processing means and said cycle control means for selectively passing control signals, and film drive means connected and responsive to the output of said OR logic means and said tone logic means for providing an output signal to said cameras proportional to the angular rate of said object relative to said photographic equipment control apparatus.

8. Photographic equipment control apparatus responsive to the movement of an object through a monitored area for controlling the operation of at least one camera, comprising a first and a second scanner for providing output signals whose frequency is proportional to the angular rate of object movement relative to said scanners and for defining the generally rectangular plan of said monitored area, signal processing means connected to the output of each of said first and said second scanners for amplifying the scanner output signals, for rejecting noise in the amplified signal and for providing a pulse train output signal whose frequency is proportional to the scanner output frequency, OR logic means connected to said signal processing means for passing the pulse train output signals of said first scanner means if pulse train signals from said second scanner means are not present and for passing pulse train signals from said second scanner means whenever present, cycle control means connected and responsive to the output signals of said OR logic means for providing control signals indicative of said objects progress through said monitored area, tone logic means connected and responsice to the outputs of said signal processing means and said cycle control means for selectively passing control signals which control the operation of said cameras, and film drive means connected and responsive to the output of said OR logic means and said tone logic means for providing an output signal to said cameras during intervals in which said object is within the photographic field of said cameras, said output signal being proportional to the angular rate of said object relative to said photographic equipment control apparatus.

9. Apparatus for guiding a moving vehicle along a preselected path within a monitored area and for initiating and controlling the operation of photographic equipment in response to vehicle movement and position within the monitored area, comprising a first and a second scanner for providing output signals whose frequency is proportional to the angular rate of said vehicle's movement relative to said scanners and for defining the plan of said monitored area,
signal processing means connected to the output of each of said first and said second scanner means for amplifying the scanner output signals, for rejecting noise in the amplified signal and for providing a pulse train output signal whose frequency is proportional to the scanner output frequency,
OR logic means connected to said signal processing means for passing the pulse train output signals of said first scanner means if pulse train signals from said second scanner means are not present and for passing pulse train signals from said second scanner means whenever present,
cycle control means connected to said OR logic means and responsive to the quantity of pulses therefrom for initiating control signals,
tone logic means connected and responsive to the outputs of said signal processing means and said cycle control means for providing guidance signals indicative of object position within the monitored area and for selectively passing control signals which control the operation of said photographic equipment,
film drive means connected and responsive to the output of said OR logic means and said tone logic means for providing an output signal to said photographic equipment during intervals in which said vehicle is within the field of said photographic equipment, said output signals being proportional to the angular rate of said vehicle relative to said scanner means, and
transmitter means connected to said tone logic means for transmitting said guidance signals to the director of said moving vehicle.

10. Apparatus in accordance with claim 9 wherein the plan of the monitored area defined by said first and said second scanner means has a rectangular outline.

11. Apparatus as defined in claim 9 wherein the plan of said monitored area defined by said first and said second scanner means has the outline of an isosceles trapezoid.

12. Apparatus for guiding a moving vehicle along a preselected path within a monitored area and for initiating and controlling the operation of photographic equipment in response to vehicle movement and position within the monitored area, comprising
 a first and a second scanner means for providing output signals whose frequency is proportional to the angular rate of object movement relative to said scanner means and for defining the plan of said monitored area,
plural signal processing means connected to said scanner means for providing a pulse train output signal for each scanner, each of said pulse train output signals having a frequency proportional to the output frequency of its associated scanner,
OR logic means connected to said plural signal processing means for passing the pulse train output signal of said first scanner means if pulse train signals from said second scanner means are not present and for passing pulse train signals from said second scanner means whenever present,
cycle control means connected and responsive to the output signal of said OR logic means for providing control signals indicative of said moving vehicles progress through said monitored area,
tone logic means connected and responsive to the outputs of said plural signal processing means and said cycle control means for providing guidance signals indicative of vehicle position within the monitored area and for selectively passing control signals,
frequency multiplier means connected and responsive to the output pulse train of said OR logic means for generating an output pulse train having a frequency that is a preselected multiple of the frequency of the pulse train at its input and proportional to the angular rate of said moving vehicle relative to said scanner means,
film drive amplifier means connected and responsive to the output of said frequency multiplier means for providing an output to said photographic equipment,
transmitter means connected to said tone logic means for transmitting said guidance signals to the director of said moving vehicle.

13. The apparatus of claim 12 wherein said frequency multiplier means comprises,
first capacitor means connected to said OR logic means for charging during positive excursions of the output wave train thereof and for discharging during negative excursions of the output wave train thereof,
operational amplifier intergrating means connected at its input to said first capacitor means and responsive to the successive negative current pulses at its input caused by discharge of said first capacitor means to raise the potential at its output,
voltage to frequency converter means connected and responsive to the output of said operational amplifier integrating means for generating an output frequency proportional to the potential at its input,
pulse shaping and feedback means including second capacitor means connected between the output of said voltage to frequency converter means and the input to said operational amplifier intergrating means for alternately charging and discharging said second capacitor means at a rate proportional to the output frequency of said voltage to frequency converter, whereby the output frequency of said voltage to frequency converter is maintained at a frequency equal to the output frequency of said or logic means times the ratio of capacitance of said first capacitor to said second capacitor.

14. Apparatus for guiding a moving vehicle along a preselected path within a monitored area and for initiating and controlling the operation of photographic equipment in response to vehicle movement and position within the monitored area, comprising
 a first and a second scanner means for providing an output signal whose frequency is proportional to the angular rate of vehicle movement relative to said scanners and for defining the plan of said monitored area and said preselected path, the plan of said monitored area having an outline defined by the composite field of said scanner means and said preselected path having its plan defined by overlapping portions of the fields of said scanner means,
a first signal processing means connected to said first scanner means, a second signal processing means connected to said scanner means, both said first and said second signal processing means being adapted to provide a pulse train output whose frequency is proportional to the output frequency of its associated scanner,
OR logic means connected to said first and said second signal processing means for passing the pulse train output signals of said first signal processing means if pulse train output signals from said second signal processing means are not present and for passing pulse train signals from said second signal processing means whenever present,
cycle control means connected to said OR logic means and responsive to the output therefrom for providing control signals indicative of the position of said moving vehicle in said monitored area,
tone logic means connected and responsive to the outputs of said first and said second signal processing means and said cycle control means for providing guidance signals indicative of vehicle position within the monitored area and for selectively passing control signals dependent upon vehicle position within the monitored area, film drive means connected and responsive to the output of said OR logic means for providing an output signal to said photographic equipment proportional to the angular rate of said vehicle relative to said scanner means, and transmitter means connected to said tone logic means for transmitting said guidance signals to the director of said moving vehicle.

15. The apparatus of claim 14 wherein the plan of said monitored area defined by said first and said second scanner means is rectangular.

16. The apparatus of claim 14 wherein the composite field area of said first and said second scanner means defines a monitored area having the outline of an isosceles trapezoid.

17. The apparatus of claim 14 wherein the plan of said preselected path defined by over-lapping portions of the field of said first and said second scanner means has the outline of an isosceles trapezoid.

18. The apparatus of claim 14 wherein the composite field area of said first and said second scanner means defines a monitored area having a plan whose outline is that of an isosceles trapezoid and the said preselected path having its plan defined by overlapping portions of the field of said first and said second scanners has the outline of a second isosceles trapezoid positioned within the outline of said first isosceles trapezoid.

19. Apparatus for determining the location of an object moving relative to a monitored area defined by said apparatus and for initiating control signals dependent on object position within the monitored area, comprising a plurality of scanners positioned to have portions of their field areas overlap, said plurality of scanners being adapted to provide an output signal frequency and to define the monitored area by their composite field area, signal processing means connected to the output of each of said plurality of scanners for amplifying the scanner output signal, for rejecting noise in the amplified signal and for providing a pulse-train output signal whose frequency is proportional to the scanner output frequency, OR logic means connected to said signal processing means for preferentially passing the pulse-train output signals of one of said plurality of scanners, cycle control means connected and responsive to the output signals of said OR logic means for providing control signals indicative of said object's progress through said monitored area, and tone logic means connected to the output of said signal processing means and said cycle control means, said tone logic means being responsive to the output of said signal processing means for selectively passing said control signals.

References Cited by the Examiner

UNITED STATES PATENTS

| | | | |
|---|---|---|---|
| 2,930,894 | 3/60 | Bozeman | 250—203 |
| 2,967,470 | 1/61 | Willits et al. | 95—12.5 |
| 3,084,301 | 4/63 | Mohan | 250—220 X |
| 3,098,933 | 7/63 | Barasch | 250—203 |

JOHN M. HORAN, *Primary Examiner.*

CHESTER L. JUSTUS, *Examiner.*